US006735863B1

(12) United States Patent
Hayman

(10) Patent No.: US 6,735,863 B1
(45) Date of Patent: May 18, 2004

(54) METHOD OF ENGINE CYLINDER BORE ENLARGEMENT

(75) Inventor: Alan W. Hayman, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/285,145

(22) Filed: Oct. 31, 2002

(51) Int. Cl.[7] ........................... B23P 11/00; B23B 39/28

(52) U.S. Cl. ..................... 29/888.06; 29/401.1; 29/406; 408/708; 408/709; 408/1 R

(58) Field of Search ........................ 29/888.06, 888.061, 29/401.1, 406, 402.06; 408/709, 708, 1 R; 123/50 R, 50 A, 50 B

(56) References Cited

U.S. PATENT DOCUMENTS

| | | | | | |
|---|---|---|---|---|---|
| 1,954,385 | A | * | 4/1934 | Johnson | 82/1.3 |
| 2,383,958 | A | * | 9/1945 | De Vlieg | 408/1 R |
| 2,613,651 | A | * | 10/1952 | Herreshoff | 92/138 |
| 3,289,501 | A | * | 12/1966 | Dubrovin | 409/132 |
| 5,050,544 | A | * | 9/1991 | Tanaka et al. | 123/90.27 |
| 6,013,016 | A | * | 1/2000 | Irvine et al. | 483/1 |

OTHER PUBLICATIONS

One–page document showing a cylinder block in cross section of the Volkswagen VR6 engine (source and date of document unknown).

* cited by examiner

*Primary Examiner*—I Cuda Rosenbaum
*Assistant Examiner*—Eric Compton
(74) *Attorney, Agent, or Firm*—Leslie C. Hodges

(57) ABSTRACT

A method is provided for forming enlarged cylinder bores in an engine based on a family of internal combustion engines having an original cylinder bore axis for each bore, wherein each cylinder bore is constrained against enlargement toward one side. The method includes providing an offset axis parallel to the original cylinder bore axis and spaced toward an opposite side of the cylinder bore by a dimension equal to one half of a predetermined bore diameter enlargement, and centering the enlarged cylinder bore on the offset axis. The method preserves a minimum wall thickness from the cylinders to camshaft bores between the cylinder banks while the outward enlargement dimension is preferably limited to a value which does not require changing the cylinder head bolt pattern or reduce the wall thickness below minimum values in other portions of the cylinders.

5 Claims, 2 Drawing Sheets

METHOD OF ENGINE CYLINDER BORE ENLARGEMENT

TECHNICAL FIELD

This invention relates to engine manufacture and, more particularly, to a method of providing enlarged cylinder bores in a cylinder block where bore enlargement is constrained on one side of the cylinder.

BACKGROUND OF THE INVENTION

It is common in the art of engine design and manufacture to provide a cylinder block with one or more cylinders arranged in one or more banks wherein the cylinders are centered on axes which intersect the longitudinal centerline or axis of the engine crankshaft carried in a lower portion of the block of crankcase. When a new engine family is designed, the cylinder walls are sometimes made thicker than absolutely necessary to leave room for a later increase in cylinder displacement by a suitable increase in the size of the cylinder bore. At some point, however, further increase in the cylinder bore to one side of the cylinders may be limited by reaching of a minimum cylinder wall thickness due to the initial design features.

For example, in a traditional overhead valve (OHV) engine, the valves may be actuated through pushrods from a camshaft located in a tunnel or series of bores positioned adjacent one side of the cylinders in a cylinder bank. In a V-type engine, the camshaft bore is conventionally located between the V-angled banks of cylinders. Thus, at some point, enlargement of the cylinder bores around the original cylinder axis may be constrained by reduction of the cylinder wall thickness at the location of the camshaft bore to a minimum wall thickness dimension, thereby limiting the ability of the engine to have the cylinder bore diameter further increased.

SUMMARY OF THE INVENTION

The present invention provides a method of enlarging the cylinder bores of a family of internal combustion engines wherein the cylinders are constrained against enlargement toward one side of the cylinders, for example, by the location of a camshaft bore or coolant jacket. If the engine construction and design conditions allow, some enlargement of the cylinder bores may be possible by offsetting the cylinder axis away from the constrained side of the cylinder and enlarging the bore by an amount permitted by the engine design. Preferably, the cylinder bore enlargement is limited to a dimension which may be provided without requiring a change in the cylinder head bolt pattern. Thus, major redesign or modification of the engine manufacturing equipment may be limited. Also, the amount of enlargement is dependent upon locations of other portions of the coolant jacket in the engine cylinder block. Nevertheless, where permitted by the design of the engine family, some significant bore enlargement may be possible without resorting to radical changes in the engine components and tooling required for manufacturing the family of engines.

In an example, the bores of the cylinders in the cylinder block of a conventional V-type OHV engine may have been designed, or previously enlarged, so that the camshaft bore constrains the cylinders against further enlargement toward the inside of the cylinder banks. An enlargement of only 3.0 mm in the bore would provide a substantial increase in the displacement of the enlarged cylinders without changing the stroke of the pistons. The engine design may permit an increase in the cylinder diameter by offsetting a new cylinder axis outward, away from the inner side of the cylinders by one half of the enlarged cylinder bore, or a 1.5 mm offset. The cylinders would then be bored on the new axis so that the outer wall of the enlarged cylinders would move outward 3.0 mm while the inner wall remains in the original position with its minimum thickness. In this instance, the change may be possible without modifying the head bolt pattern provided by the current engine tooling and without dropping below a wall thickness between other parts of the cylinders and the water jacket or other adjacent cavities.

Movement outward of the cylinder axes causes an offset of the cylinders so that the cylinder axes do not intersect the axis of the camshaft, as is conventional in engines. Instead, in a V engine of the invention, the cylinder axes of the opposite banks intersect a reference line below and parallel to the crankshaft axis by a small dimension. The invention provides the benefit of increased engine displacement without a requirement for major retooling of an engine line where conventional methods of bore enlargement could not be utilized. The relatively small offset of the cylinder axes could have slightly different effects on the two banks of cylinders, as far as piston thrust loads and possibly ignition timing are concerned. However, the differences should not exceed reasonable limits and may have advantages for deactivated cylinder operation where one bank of cylinders is deactivated for operation in a lower power range.

These and other features and advantages of the invention will be more fully understood from the following description of certain specific embodiments of the invention taken together with the accompanying drawings.

DESCRIPTION OF THE PREFERRED EMBODIMENT

Figure 1:
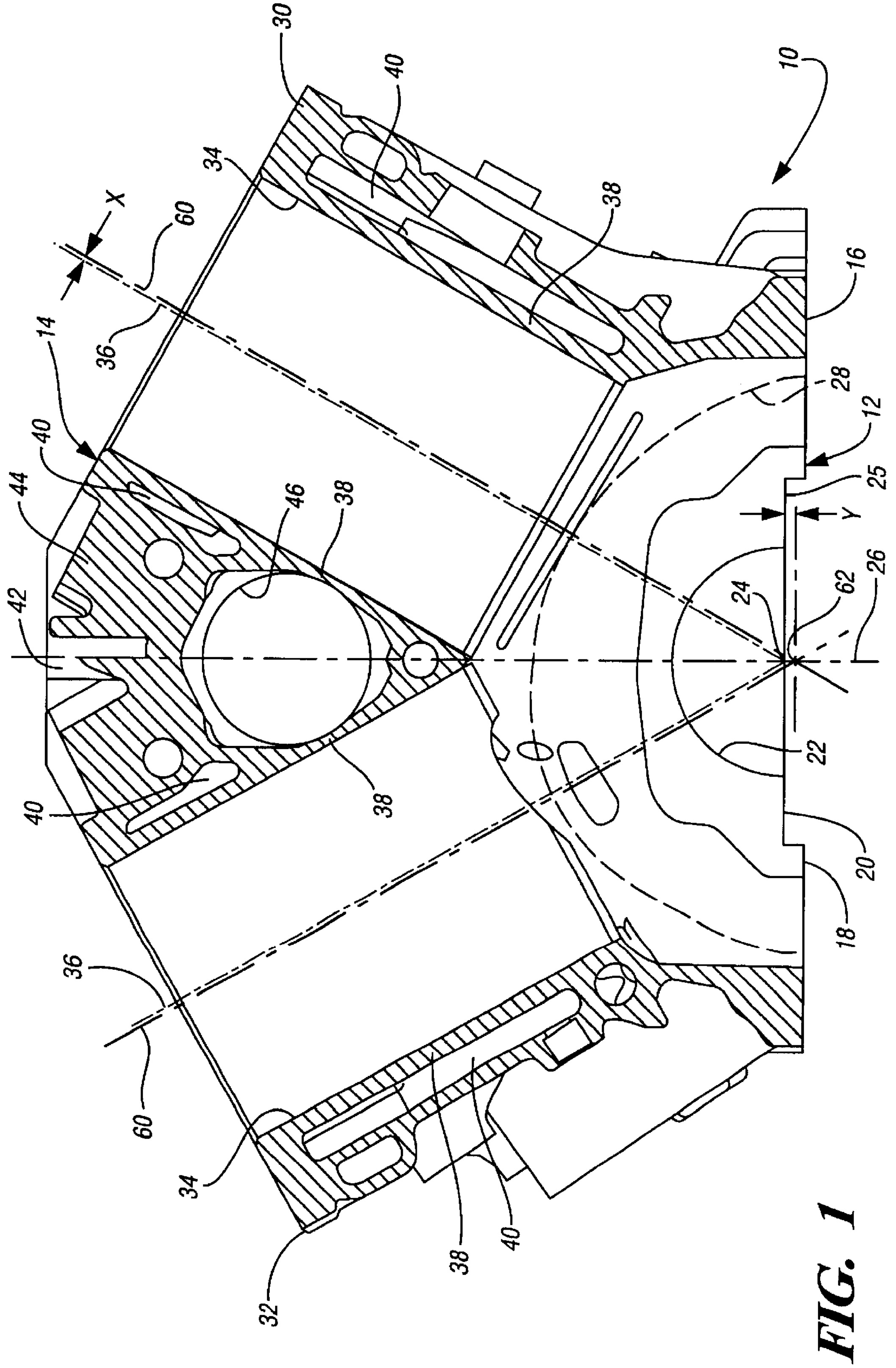
FIG. 1 is a cross-sectional view through a cylinder block representative of a family of traditional V-type OHV engines modified according to the invention.

Referring now to the drawings in detail, numeral 10 generally indicates a cylinder block for a family of V-6 engines wherein the cylinder block is modified in accordance with the invention. The cylinder block is conventionally formed of cast iron and includes a lower crankcase portion 12 and an upper cylinder portion 14.

The crankcase portion includes a lower face 16 including transverse webs 18, each of which has a central recess 20 for receiving a main bearing cap, not shown, one for each of the webs. A semi-circular cutout 22 is centered above the recess 20 and provides for retention of a crankshaft-bearing insert, a similar mating insert being carried in a recess in an associated bearing cap, not shown. Cutout 22 is centered on a longitudinal crankshaft axis 24 which lies in a horizontal plane 25 of recesses 20 and also in a central vertical plane 26 of the cylinder block. In assembly, a crankshaft is rotatably mounted in the bearing inserts provided in the various webs 18 and associated bearing caps, not shown, of the engine.

An arcuate dashed line 28 represents the clearance line for counterweights and associated portions of connecting rods rotatable with the crank throws, not shown, of the engine.

The cylinder portion 14 of the engine block 10 includes right and left banks 30, 32, each bank being provided with three longitudinally aligned cylinders 34. In original models of the family of engines for which the cylinder block is designed, the cylinder bores were centered on original axes 36, which are oriented to intersect the crankshaft axis 24 so that the cylinders are centered at right angles to the crankshaft, not shown. The cylinders include external walls 38 which are wholly or partially surrounded with coolant jackets or water jackets 40 for cooling the cylinders during engine operation. In a central space 42 between the cylinder banks 30, 32, webs 44 connect the banks and include camshaft bores 46 for rotatably supporting a valve actuating camshaft, not shown.

Figure 2:
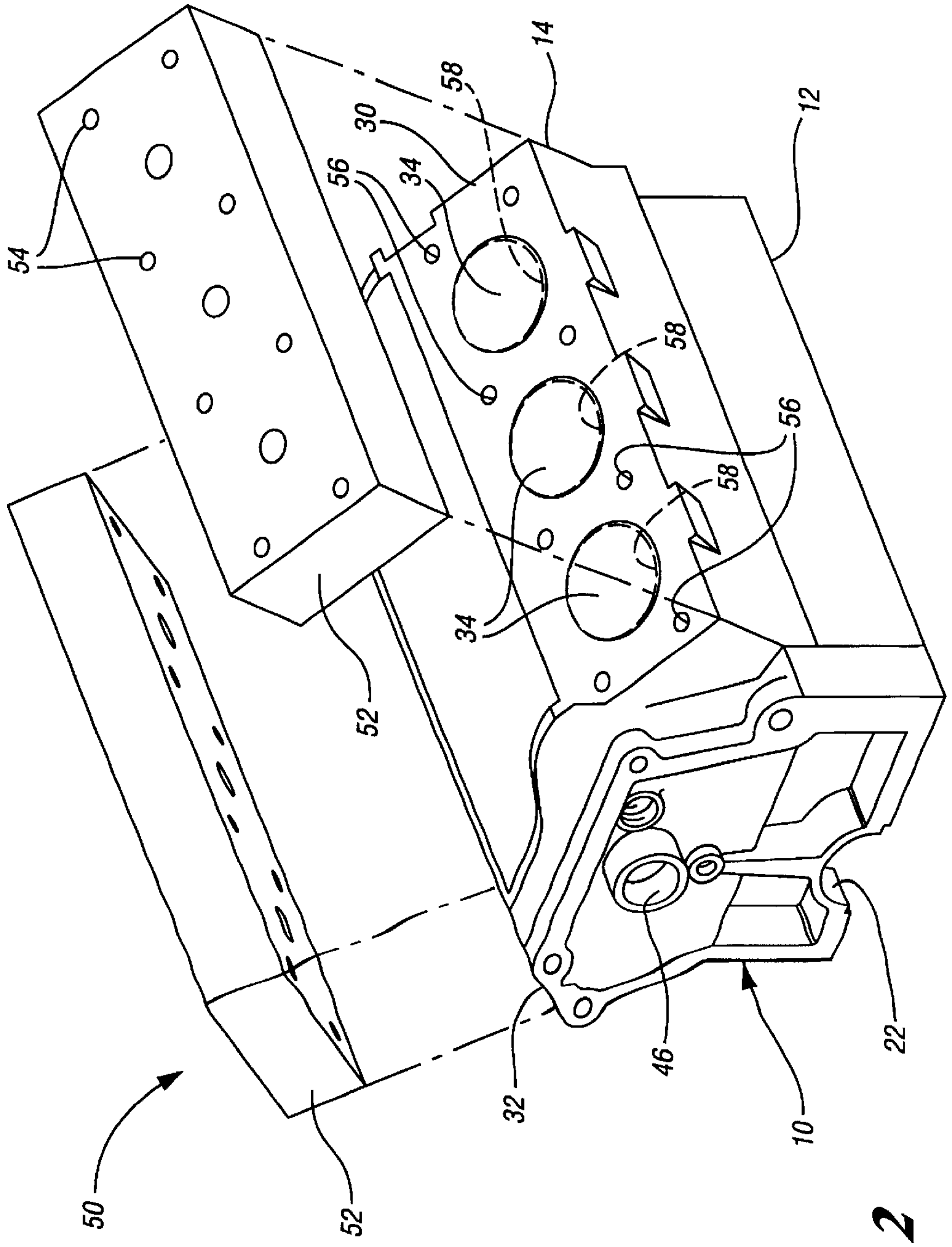
FIG. 2 is an exploded pictorial view of an OHV engine showing enlarged cylinder bores and a representative cylinder head bolt pattern for a V-6 engine according to the invention.

In assembly of an engine 50, as shown in part in FIG. 2, the outer ends of the cylinders 34 are closed by cylinder heads 52. Joints between the heads and the cylinder block are sealed by head gaskets, not shown, and the heads are retained on the block by bolts or studs, not shown, passing through or into stud openings 54 in the cylinder heads and stud openings 56 in the cylinder block. These openings are arranged in a fixed pattern, called the head bolt pattern, that provides for securing the heads tightly against the cylinder block with adequate pressure exerted on the head gaskets to insure retention of the cylinder compression and firing pressures.

For an engine family with relatively large production, the tooling for casting the cylinder block bosses and machining the stud openings in the engine block and cylinder heads is limited to providing the fixed head bolt pattern of the original design of the engine family. Accordingly, changes of the head bolt pattern may require large tooling and design expense which it is desired to avoid when modifying the engine design.

At some point in the design or modification history of an engine family based on the cylinder block 10, the camshaft bores 46 or the water jackets 40 or both may provide a constraint against enlargement or further enlargement of the engine cylinder bores around the original axes 36. This occurs at a point where the cylinder wall 38 at, for example, the location of the camshaft bores 46 reaches a minimum thickness beyond which the cylinder bores cannot be further enlarged without causing a reduction below the minimum wall thickness for the cylinder.

FIGS. 1 and 2 show such a condition in the design and/or development of an engine family. The walls 38 of the cylinders reached a minimum thickness at the location of the camshaft bores 36 while the original cylinders, represented by dashed lines 58 in FIG. 2, were centered on the original cylinder axes 36, shown in FIG. 1.

In considering how the cylinder bores might be further expanded without major modification of the engine design, it was recognized that the cylinders could be enlarged outwardly a small amount, such as 3.0 mm, without requiring modification of the head bolt pattern or resulting in excessively thin cylinder walls adjacent the water jackets 40 at other locations in the cylinder block. Accordingly, the engine design was altered by providing outwardly offset cylinder bore axes 60. The axes 60 were offset by a dimension X which is equal to one half the dimension of the increase in bore diameter of the cylinders 34 relative to the original cylinders 58 of the engine family. The offset of the bore axes is in a direction outward toward the outer sides of cylinders and away from the inner sides of the cylinders where the minimum thickness walls are located adjacent the camshaft bores. At the new location, the bore axes 60 intersect a longitudinal reference line 62 parallel with the crankshaft axis 24 and extending below the axis 24 by a vertical dimension Y.

To complete the modification of the engine block design, the enlarged cylinders 34 are machined centered on the offset bore axes 60 so that the inside walls of the cylinders remain at the desired minimum thickness while the outside walls of the cylinders are reduced in thickness by the amount of the cylinder enlargement dimension. This enlargement is limited in the design phase by the configuration of other aspects of the cylinder block to an amount which does not exceed a minimum wall thickness at any location around the cylinder.

As a result of the method of the present invention, the cylinders are enlarged sufficiently to provide a substantial increase in the cylinder displacement of the enlarged engine cylinders. This enlargement is limited to avoid a reduction of the cylinder wall thicknesses below desired minimums and to avoid any change in the engine cylinder head bolt pattern which would require excessive tooling expense. Some modification of the cylinder head design and/or machining may be required depending upon the form of the engine combustion chambers. Also, larger pistons and piston rings will be required for the increased displacement engine model based on the original engine family design. However, a substantial increase in engine displacement with accompanying power and performance increases is provided with a minimum of new tooling expense.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of forming at least one enlarged cylinder bore of an engine based on a family of internal combustion engines having an original cylinder bore axis for each bore, wherein each cylinder bore is constrained against enlargement toward one side thereof, the method comprising:

providing an offset axis parallel to the original cylinder bore axis and spaced toward an opposite side of the cylinder bore from said one side by a dimension equal to one-half of a predetermined bore diameter enlargement; and centering the enlarged cylinder bore on the offset axis.

2. A method as in claim 1 wherein the engine has a cylinder head with a fixed head bolt pattern that permits each predetermined cylinder bore diameter enlargement in a direction toward said opposite side of the cylinder, the method including the step of limiting the bore diameter enlargement to a dimension permitted by the fixed head bolt pattern so that changing of the head bolt pattern for the engine family is avoided.

3. A method as in claim 1 wherein the engine family has a cylinder block configuration that permits each predetermined cylinder bore diameter enlargement in a direction toward said opposite side of the cylinder, the method including the step of limiting the diameter enlargement to a dimension permitted by the cylinder block configuration so that changing of the block configuration is avoided.

4. A method as in claim 1 including providing a cylinder block including a camshaft bore adjacent each enlarged cylinder bore wherein the cylinder and camshaft bores define a minimum wall thickness along said one side of the cylinder.

5. A method as in claim 1 including:

providing a cylinder block having a pair of V-angled cylinder banks with at least one enlarged cylinder bore in each bank and a camshaft bore between the banks and defining with the cylinder bores a minimum wall thickness along inner sides of the cylinders, wherein original axes of the cylinder bores of the engine family intersect a longitudinal axis of a crankshaft bore;

providing offset cylinder bore axes for each of the enlarged cylinders and spaced toward outer sides of the cylinders by dimensions equal to one-half of a predetermined cylinder bore diameter enlargement, the offset axes intersecting a longitudinal reference line parallel to and below the crankshaft axis; and centering the enlarged cylinder bores on the offset axes.

* * * * *